United States Patent [19]

Mikami et al.

[11] Patent Number: 5,300,241

[45] Date of Patent: Apr. 5, 1994

[54] TREATMENT AGENT FOR POLYESTER FIBER

[75] Inventors: Ryuzo Mikami; Isao Ona; Masaru Ozaki, all of Chiba, Japan

[73] Assignee: Dow Corning Toray Silicone Co. Ltd., Tokyo, Japan

[21] Appl. No.: 952,398

[22] Filed: Sep. 28, 1992

[30] Foreign Application Priority Data

Sep. 27, 1991 [JP] Japan .................................. 3-277095

[51] Int. Cl.$^5$ .............................................. D06M 15/00
[52] U.S. Cl. ...................................... 252/8.8; 252/8.6; 428/266; 428/391; 428/447; 427/387; 427/393.3; 556/413; 556/418; 556/425
[58] Field of Search ........................ 556/413, 418, 425; 252/8.6, 8.8; 428/266, 447, 391; 427/387, 393.3

[56] References Cited

U.S. PATENT DOCUMENTS

| | | |
|---|---|---|
| 3,595,895 | 7/1971 | Bush et al. .......................... 556/412 |
| 3,641,087 | 2/1972 | Holman ........................... 556/412 X |
| 3,646,087 | 2/1972 | Bennett et al. ...................... 556/413 |
| 4,102,670 | 7/1978 | Foery et al. ..................... 556/413 X |
| 4,670,423 | 6/1987 | Böshagen et al. ............... 556/413 X |
| 5,026,489 | 6/1991 | Snow et al. ............... 252/8.8 |
| 5,087,716 | 2/1992 | Wright et al. ..................... 556/413 |
| 5,158,811 | 10/1992 | Liu ................................. 252/8.8 X |
| 5,171,464 | 12/1992 | de Montigny et al. .......... 252/8.6 X |

*Primary Examiner*—Arthur C. Prescott
*Attorney, Agent, or Firm*—Timothy J. Troy; Alexander Weitz

[57] ABSTRACT

The present invention relates to a polyester-fiber-treatment agent that can impart smoothness and flexibility to polyester fiber at the same time that it also equips the polyester fiber with nonflammability. The treatment agent for the polyester fiber is based on an organosilicon compound that contains an organic group comprising a bromine-containing organic group bonded to silicon via carbon where the organosilicon compound has a bromine content of at least 5 weight percent.

17 Claims, No Drawings

TREATMENT AGENT FOR POLYESTER FIBER

BACKGROUND OF THE INVENTION

The present invention relates to a composition for a treatment agent for polyester fiber (polyester-fiber-treatment agent or PFTA). More specifically, the present invention relates to a PFTA that is capable of imparting smoothness and flexibility to polyester fiber at the same time that it can equip polyester fiber with nonflammability. Polyester (PE) fiber has better heat-settability, crease resistance, and dyeability than other synthetic fibers such as nylon fiber, acrylonitrile fiber, polyvinyl chloride fiber, and polypropylene fiber, and has therefore been used for clothing fabric where such properties are critical. However, polyester fiber suffers from poor flexibility and poor smoothness. In response to these problems, there have been attempts at improving the smoothness and flexibility of polyester fiber or PE fiber-based fabric through the application of various types of organopolysiloxanes, for example, dimethylpolysiloxanes, amino-containing organopolysiloxanes, epoxy-containing organopolysiloxanes, and carboxyl-containing organopolysiloxanes. However, all of the above-listed organopolysiloxanes are flammable compounds, and the flammability of PE fiber coated with them is therefore increased. In order to resolve this problem, various types of flame retardants have been blended into PE resins and the aforementioned polyorganosiloxane has then been applied to the PE fiber or fabric made from this flame-retarded PE resin. However, these methods are unsatisfactory because they cause a deterioration in the physical properties of the PE fiber.

SUMMARY OF THE INVENTION

The present inventors carried out intensive investigations directed at solving the problems described above, and they discovered as a result that treating PE fiber with a particular organosilicon compound can make the PE fiber itself nonflammable while at the same time imparting smoothness and flexibility to the PE fiber. The present invention was developed based on this discovery.

The present invention takes as its object the introduction of a polyester-fiber-treatment agent that can impart smoothness and flexibility to PE fiber while simultaneously imparting nonflammability thereto.

The aforesaid object is accomplished by means of a polyester-fiber-treatment agent which is based on an organosilicon compound wherein the organosilicon compound contains an organic group comprising a bromine-containing organic group bonded to silicon via carbon and has a bromine content of at least 5 weight %.

DETAILED DESCRIPTION OF THE INVENTION

To explain the preceding in greater detail, the organosilicon compound constituting the PFTA of the present invention is an organosilicon compound that (i) contains an organic group comprising a bromine-containing organic group bonded to silicon via carbon and (ii) contains at least 5 weight % bromine and preferably 5 weight % to 50 weight % bromine. The nonflammability declines sharply at bromine contents below 5 weight %. The three types of organosilicon compounds discussed hereinbelow are particularly preferred as this organosilicon compound.

Organosilicon compounds comprising the addition reaction product of (A1) an amino-containing organosilicon compound and (B1) a vinyl-containing brominated organic compound are one type of organosilicon compound preferred for the compositions of the present invention. This organosilicon compound will be considered in greater detail in the following. Amino-containing organosilicon compounds suitable as component (A1) are exemplified by the following organosilicon compounds, amino-containing alkoxysilanes such as

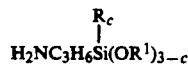

where R and $R^1$ represent monovalent hydrocarbon groups and $c = 0$ or 1,

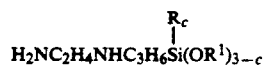

where R and $R^1$ represent monovalent hydrocarbon groups and $c = 0$ or 1, and organopolysiloxanes having the formula

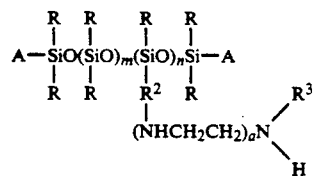

where R represents monovalent hydrocarbon groups, $R^2$ represents divalent hydrocarbon groups, $R^3$ is a group selected from the group consisting of hydrogen and monovalent hydrocarbon groups, A is a group selected from the group consisting of R groups, hydroxyl group, and alkoxy groups, m and n are both integers with values of at least 1; and a is an integer with a value of zero to 5.

In the preceding formulas, the monovalent hydrocarbon groups comprising R and $R^1$ are exemplified by methyl, ethyl, propyl, butyl, pentyl, cyclohexyl, vinyl, allyl, 3,3,3-trifluoropropyl, and phenyl. Methyl is preferred among these groups, and methyl preferably comprises at least 50 mole % of the monovalent hydrocarbon groups. $R^3$ is a group selected from the group consisting of hydrogen and monovalent hydrocarbon groups, and the latter are exemplified as for R and $R^1$ by methyl, ethyl, propyl, phenyl, and cyclohexyl. The terminal group A is selected from monovalent hydrocarbon groups as in R above, the hydroxyl group, and $C_{1-5}$ alkoxy groups, and A is typically the hydroxyl group or a monovalent hydrocarbon group. The divalent hydrocarbon groups comprising $R^2$ are exemplified by alkylene groups such as $-CH_2-$, $-CH_2CH_2-$, $-CH_2CH_2CH_2-$, $-CH(CH_3)CH_2-$, and $-(CH_2)_4-$, and by arylene groups such as $-(CH_2)_2-C_6H_4-$. This group is most frequently represented by an ethylene or propylene group. Finally, m and n are each integers with values of at least 1.

Among the preceding amino-containing organosilicon compounds, the above-described organopolysiloxanes are preferred. Among these organopolysiloxanes, those having viscosities of at least 50 centistokes at 25° C. are preferred for the purpose of imparting flexibility, smoothness, and compression recovery. Viscosities of 300 to 10,000 centistokes at 25° C. are particularly preferred. The subscript a represents an integer with a value of 0 to 5, and it is typically 0 or 1. This component can be readily synthesized, for example, as disclosed in Japanese Patent Application Laid Open (Kokai or Unexamined) Number 53-98499 (98,499/1978) as follows.

A dialkoxysilane with the formula $H_2N(CH_2)_3SiCH_3(OCH_3)_2$ is hydrolyzed with excess water, an equilibration reaction is then run by heating the obtained hydrolysis/condensation product and dimethylcyclopolysiloxane to 80° to 100° C. in the presence of a basic catalyst (e.g., sodium hydroxide) but without using an end-blocking agent, and the basic catalyst is neutralized with acid when the desired viscosity is reached.

The vinyl-containing brominated organic compound comprising component (B1) is exemplified by the following organic compounds:

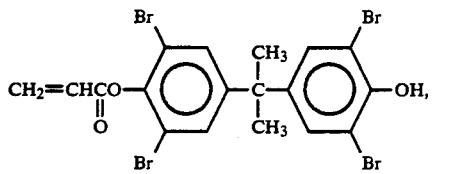

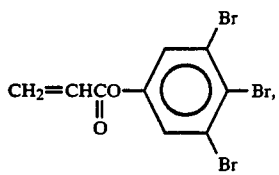

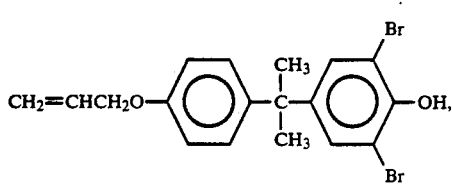

and

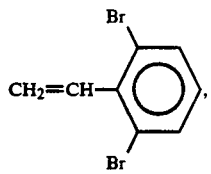

This organosilicon compound is prepared by addition-reacting the above-described components (A1) and (B1). This addition reaction is a reaction in which components (A1) and (B1) become chemically bonded through addition of the amino groups in component (A1) across the vinyl groups in component (B1). This addition reaction proceeds readily merely upon heating even in the absence of a catalyst. This organosilicon compound is easily synthesized, for example, by stirring a mixture of component (A1) and component (B1) at 40° to 80° C. for 1 to 5 hours. The number of moles of component (B1) in this reaction mixture should be equal to the number of moles of amino groups in the component (A1) in the reaction mixture.

Another organosilicon compound useful in the compositions of the present invention is an organosilicon compound comprising the addition-reaction product of (A2) an SiH-containing organosilicon compound and (B2) a vinyl-containing brominated organic compound.

To describe the organosilicon compound that comprises (A2) and (B2) in greater detail, the SiH-containing organosilicon compound used as component (A2) is exemplified by the following compounds:

where R represents one or more monovalent hydrocarbon groups and a is 0 or 1,

where R represents one or more monovalent hydrocarbon groups and x is 0 or an integer with a value of at least 1, and

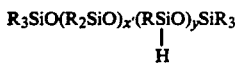

where R represents one or more monovalent hydrocarbon groups and x' and y are both integers with values of at least 1.

In the preceding formulas R represents monovalent hydrocarbon groups, as exemplified by methyl, ethyl, propyl, butyl, pentyl, cyclohexyl, vinyl, allyl, 3,3,3-trifluoropropyl, and phenyl. It is not necessary that all the groups R within the single molecule be the same. While R is most typically methyl, combinations of methyl and another group are also common. The x, x', and y units are not specifically restricted, however, x will depend on the bromine content of component (B2) and preferably falls within the range of 5 to 150. The x and x' units provide smoothness and flexibility, and x' should fall within the range of 5 to 1,000 and y should fall within the range of 2 to 100. The particularly preferred range for x' is 100 to 500 and for y is 5 to 50.

The vinyl-containing brominated organic compound comprising (B2) is exemplified by the corresponding organic compounds discussed hereinabove for (B1) which is also a vinyl-containing brominated organic compound. The organosilicon compound comprising (A2) and (B2) can be prepared by addition-reacting the aforementioned components (A2) and (B2). This addition reaction is a reaction in which components (A2) and (B2) become chemically bonded through addition of the silicon-bonded hydrogen in component (A2) across the vinyl groups in component (B2). This addition reaction is easily run by heating (A2) and (B2) in the presence of a hydrosilylation-reaction catalyst, as typified by platinum catalysts. For example, this organosilicon compound is readily synthesized by stirring the mixture of components (A2) and (B2) for 1 to 5 hours at 90° to 150° C. The number of moles of component (B2) in this reaction mixture should be equal to the number of moles of silicon-bonded hydrogen in the component (A2) in the reaction mixture.

Another organosilicon compound suitable for use in the compositions of the present invention are organosilicon compounds comprising the addition-reaction product of (A3) an amino-containing organosilicon compound and (B3) an epoxy-containing brominated organic compound.

This organosilicon compound will be considered in greater detail in the following. The amino-containing organosilicon compound comprising component (A3) is exemplified by the corresponding organosilicon compounds described hereinabove for (A1) which is also an amino-containing organosilicon component. The following organic compounds are exemplary of the epoxy-containing brominated organic compounds comprising component (B3):

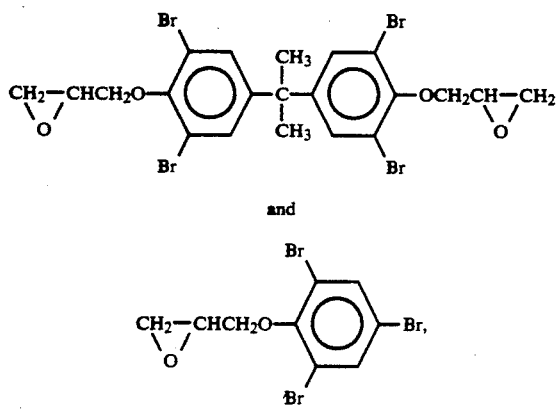

and

The organosilicon compound comprising components (A3) and (B3) can be synthesized by addition-reacting the aforementioned components (A3) and (B3). This addition reaction is a reaction in which components (A3) and (B3) become chemically bonded by the addition of the amino groups in component (A3) across the epoxy groups in component (B3). In order to apply the PFTA according to the present invention, it is first dissolved to homogeneity in a solvent, as exemplified by aromatic solvents such as toluene and xylene, chlorinated solvents such as perchloroethylene and 1,1,1-trichloroethane, and aliphatic hydrocarbon solvents such as hexane, heptane, and mineral terpene. A sprayer may then be used to uniformly spray this solution onto the fabric, yarn, staple, tow, filament, or spun-yarn-based mechanical sewing thread. Alternatively, the treatment solution and fiber or fabric may be brought into contact using rollers, or the fiber or fabric may be immersed in the solution and then pressed out on rollers to achieve a uniform loading. Application is followed by drying, and a loading of 0.2 to 5.0% organosilicon compound applied to the fiber or fabric should thereby be obtained. Finally, a heat treatment is implemented in order to tightly bind the organosilicon compound to the polyester fiber by reaction or adsorption. In addition, the PFTA according to the present invention can also be used in emulsion form as generated through the use of an emulsifying agent. Emulsifying agents operable in this regard are the nonionic, anionic, and cationic surfactants. The nonionic surfactants are exemplified by polyoxyalkylene alkyl ethers, polyoxyalkylene alkylphenol ethers, polyoxyalkylene alkyl esters, polyoxyalkylene sorbitan alkyl esters, polyethylene glycols, polypropylene glycols, and diethylene glycol.

The anionic surfactants are exemplified by alkylbenzenesulfonic acids such as hexylbenzenesulfonic acid, octylbenzenesulfonic acid, decylbenzenesulfonic acid, dodecylbenzenesulfonic acid, cetylbenzenesulfonic acid, and myristylbenzenesulfonic acid; the sulfuric acid esters of polyoxyethylene monoalkyl ethers such as $CH_3(CH_2)_6CH_2O(C_2H_4O)_2SO_3H$,
$CH_3(CH_2)_8CH_2O(C_2H_4O)_8SO_3H$,
$CH_3(CH_2)_{19}CH_2O(C_2H_4O)_4SO_3H$, and
$CH_3(CH_2)_8CH_2C_6H_4O(C_2H_4O)_2SO_3H$, and the sodium, potassium, and amine salts of alkylnaphthylsulfonic acids.

The cationic surfactants are exemplified by quaternary ammonium hydroxides such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide, dioctadecyldimethylammonium hydroxide, and beef tallow trimethylammonium hydroxide, as well as salts of the preceding.

The use of surfactant typically involves use of only a nonionic surfactant, the use of a combination of nonionic surfactants and anionic surfactants, or the use of a combination of nonionic surfactants and cationic surfactants. While the quantity of use of surfactant will vary with the type of surfactant, the surfactant should be employed in the range of 1 to 50 weight parts per 100 weight parts organosilicon compound component and is preferably employed in the range of 2 to 15 weight parts per 100 weight parts organosilicon compound component.

In order to bring about emulsification, the organosilicon compound, surfactant, and water are first mixed, this is then passed through an emulsifying device such as an homogenizer, colloid mill, line mixer, sonolator, etc., and water is then optionally added to give the uniformly emulsified dispersion. In addition to the organosilicon compound component described hereinabove, this emulsion or the PFTA dissolved in solvent as described above may be used in combination with hydroxyl-terminated or alkoxy-terminated diorganopolysiloxane, methyltrialkoxysilane, epoxysilane, aminosilane, or hydrolyzates of the preceding, as well as preservatives, rust inhibitors, and colorants. As with the solvents discussed hereinbefore, the emulsion is diluted with water to an organosilicon compound concentration of 0.5 to 5.0% and then uniformly applied by spray, immersion, roll coating, etc., to the polyester weave, knit, nonwoven, mechanical sewing thread, staple fiber, or tow. This is followed by drying and heat treatment to bring about a firm adherence to the surface of the polyester fiber.

The present invention is explained in greater detail below through illustrative examples, in which parts designates weight parts, % designates weight %, cst is an abbreviation for centistokes, and the viscosity is the value measured at 25° C.

In the examples, the crease resistance, nonflammability, and smoothness of fabric and yarn made from polyester fiber were evaluated by the following methods after treatment with the PFTA.

The crease resistance and nonflammability of the samples were evaluated as follows. The polyester fiber fabric for these tests was doeskin suit fabric (30×30 cm) made of 100% polyester processed yarn. The sample was immersed in the PFTA, wrung out on rollers to an expression ratio of 100%, (expression ratio is calculated by the following formula: ((weight of wetted fabric — weight of dried fabric)/dried fabric)×100), thus an expression ratio of 100% means that the amount of finishing agent which is adhered to the sewing thread is equal to the weight of the dried fabric), dried at room temperature, and finally heat treated in a hot-air drier for 3 minutes at 130° C. The crease resistance was measured on the treated fabric by the method stipulated in Section 6.22 of JIS (Japanese Industrial Standard) L-1096, "Crease Resistance Method B" (Monsanto method). The oxygen index was measured by running a combustion test on the treated fabric based on the method specified in JIS K 7201.

Evaluation of smoothness of the samples was as follows. The sample for this evaluation was polyester staple fiber (7 d×65 mm fiber length) for application as futon or mattress fill. This fiber was treated as above, and its fiber-to-fiber coefficients of static and dynamic friction were then measured.

EXAMPLE 1

100 Parts amino-containing dimethylpolysiloxane (viscosity=1,100 cst) with the following formula $$(CH_3)_3SiO[(CH_3)_2SiO]_{400}(SiO)_8Si(CH_3)_3$$
$$\underset{C_2H_4NH_2}{\underset{|}{\underset{NH}{\underset{|}{C_3H_6}}}}$$

was introduced with 100 parts of toluene into a 500 cc four-neck flask with dissolution to homogeneity. This was followed by the introduction of 9.9 parts brominated organic compound with the formula

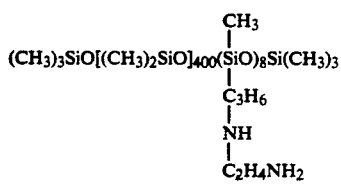

with stirring to bring about complete dissolution. A reaction was run by heating to 70° C. and maintenance at this temperature for 5 hours. The resulting reaction mixture contained a bromine-containing dimethylpolysiloxane with the following formula:

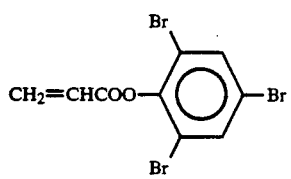

(bromine content=5.7%). Toluene was added to this dimethylpolysiloxane to give 209.9 parts of a toluene dispersion that contained 109.9 parts of the dimethylpolysiloxane. 5.0 Parts of this dispersion was diluted by the addition of 514 parts toluene, thereby affording a PFTA containing 0.5% bromine-containing dimethylpolysiloxane. The properties of polyester fiber treated with the PFTA were measured, and the results are reported in Table I below.

EXAMPLE 2

100 Parts amino-containing dimethylpolysiloxane (viscosity=1,170 cst) with the following formula $$(CH_3)_3SiO[(CH_3)_2SiO]_{376}(SiO)_{24}Si(CH_3)_3$$
$$\underset{NHC_2H_4NH_2}{\underset{|}{C_3H_6}}$$

was introduced with 100 parts toluene into a 500 cc four-neck flask with dissolution to homogeneity. This was followed by the introduction of 29.0 parts brominated organic compound with the formula

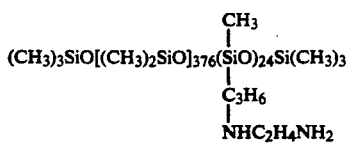

with stirring to bring about complete dissolution. A reaction was run by heating to 70° C. and maintenance at this temperature for 5 hours to give 229.0 parts of a toluene dispersion that contained 129.0 parts bromine-containing dimethylpolysiloxane with the following formula:

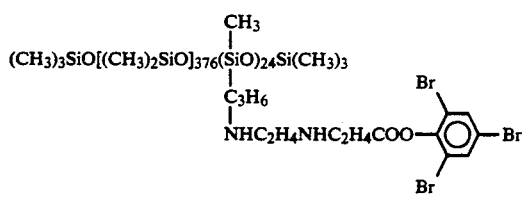

(bromine content=14.1%). 5.0 Parts of this dispersion was diluted by the addition of 553 parts toluene, thereby affording a PFTA containing 0.5% bromine-containing dimethylpolysiloxane. The properties of polyester fiber treated with the PFTA were measured, and the results are reported in Table I below.

EXAMPLE 3

5 Parts amino-containing silane with the following formula:

$$CH_3Si(OC_2H_5)_2C_3H_6NH_2$$

was introduced with 200 parts toluene into a 500 cc four-neck flask with dissolution to homogeneity. Into this was then introduced 10.1 parts brominated organic compound with the following formula:

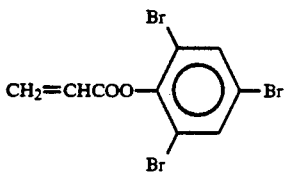

with dissolution to homogeneity. A reaction was run by heating to 70° C. and maintenance at this temperature for 5 hours in order to synthesize a bromine-containing organosilicon compound with the following formula:

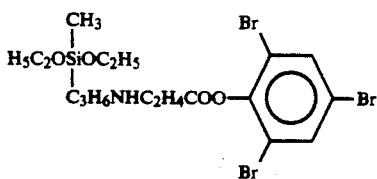

(bromine content=41.0%)

After cooling, 8 parts dimethylpolysiloxane (viscosity=50 cst) with the following formula

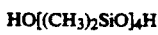

was added with dissolution. 10.0 Parts of this dispersion was supplemented with 626 parts toluene to obtain a PFTA containing 0.5% of the bromine-containing organosilicon compound. The properties of polyester fiber treated with the PFTA were measured, and the results are reported below in Table I.

EXAMPLE 4

23 Parts amino-containing dimethylpolysiloxane (viscosity=85 cst) with the following formula:

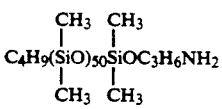

and 20 parts xylene were introduced into a 300 cc four-neck flask with dissolution to homogeneity. 10.0 Parts epoxy-containing brominated organic compound with the following formula was then added

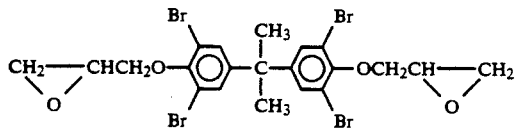

Heating for 5 hours at 145° C. afforded a reaction product in the form of bromine-containing dimethylpolysiloxane with a bromine content of 7.0%. Xylene was then added to this dimethylpolysiloxane to give a xylene dispersion that contained 62.3% of said dimethylpolysiloxane. 574 Parts toluene was added to 5.0 parts of this dispersion to afford a PFTA containing 0.5% bromine-containing dimethylpolysiloxane. The properties of polyester fiber treated with the PFTA were measured, and the results are reported in Table I below.

COMPARISON EXAMPLE 1

A fiber treatment agent was prepared as in Example 1, but in the present case using the amino-containing dimethylpolysiloxane precursor to the bromine-containing dimethylpolysiloxane in Example 1 in place of the bromine-containing dimethylpolysiloxane itself. The properties of polyester fiber treated with the fiber treatment agent were measured, as in Example 1, and these results are reported in Table I below.

COMPARISON EXAMPLE 2

A fiber treatment agent was prepared as in Example 1, but in the present case using the brominated organic compound precursor to the bromine-containing dimethylpolysiloxane synthesized in Example 1 in place of the bromine-containing dimethylpolysiloxane itself. The properties of this fiber treatment agent were measured as in Example 1, and these results are reported in Table I below.

COMPARISON EXAMPLE 3

A fiber treatment agent was prepared as in Example 1. However, in this case the bromine-containing dimethylpolysiloxane synthesized in Example 1 was replaced by 9.9 parts of the brominated organic compound and 100 parts of the amino-containing dimethylpolysiloxane that were the starting materials for the bromine-containing dimethylpolysiloxane synthesized in Example 1. The properties of polyester fiber treated with the fiber treatment agent were measured as in Example 1, and these results are reported in Table I below.

COMPARISON EXAMPLE 4

100 parts amino-containing dimethylpolysiloxane (viscosity=1,080 cst) with the following formula

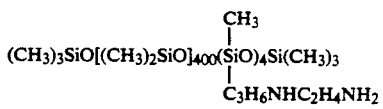

was introduced with 100 parts toluene into a 500 cc four-neck flask with dissolution to homogeneity. This was followed by the introduction of 5.06 parts brominated organic compound with the following formula

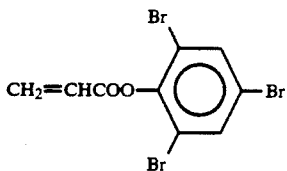

and reaction as in Example 1 to give a bromine-containing dimethylpolysiloxane with the following formula

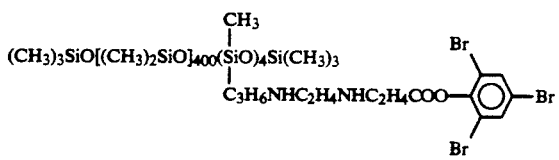

(bromine content=3.2%) Then, proceeding as in Example 1, a toluene dispersion containing 0.5% of this bromine-containing dimethylpolysiloxane was prepared in order to obtain a PTFA. The properties of polyester fiber treated with the fiber treatment agent were measured, as in Example 1, and these results are reported in Table I below.

The properties of untreated polyester fiber (polyester fiber which is not treated with a fiber finishing agent) were measured as in Example 1 and these results are reported in Table I below (Comparison Example 5).

TABLE I

| EXAMPLE | CREASE RESISTANCE (%) | OXYGEN INDEX | SCF | DCF | HANDLE | GLOBAL EVALUATION |
|---|---|---|---|---|---|---|
| 1 | 80 | 22.8 | 0.122 | 0.103 | EXCELLENT STRONG BULKY FEEL SMOOTH | EXCELLENT |
| 2 | 79 | 23.5 | 0.128 | 0.106 | EXCELLENT | EXCELLENT |
| 3 | 79 | 22.8 | 0.125 | 0.105 | EXCELLENT | EXCELLENT |
| 4 | 78 | 22.7 | 0.125 | 0.104 | EXCELLENT | EXCELLENT |
| COMP. EXAMPLE | | | | | | |
| 1 | 80 | 18.8 | 0.128 | 0.102 | VERY SLICK FEEL | UNSATISFACTORY |
| 2 | 69 | 19.3 | 0.395 | 0.273 | HARSH HANDLE INFERIOR TO UNTREATED MATERIAL | POOR |
| 3 | 78 | 19.0 | 0.132 | 0.118 | LOW SMOOTHNESS | UNSATISFACTORY |
| 4 | 79 | 18.9 | 0.133 | 0.108 | VERY SLICK FEEL | UNSATISFACTORY |
| 5 | 70 | 19.5 | 0.325 | 0.225 | HARSH HANDLE POOR SMOOTHNESS POOR BULKINESS | POOR |

In Table I shown hereinabove, SCF denotes Static Coefficient of Friction, DCF denotes Dynamic Coefficient of Friction, and global evaluation refers to the evaluation of the example as a nonflammable agent for improving the handle and smoothness of polyester.

EXAMPLE 5

50 Parts dimethyl-methylhydrogenpolysiloxane (viscosity=135 cst) with the following formula

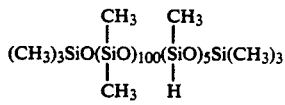

was introduced with 20 parts toluene into a four-neck flask and dissolved. 8.6 Parts brominated organic compound with the following formula:

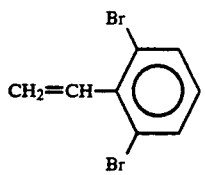

was then introduced with dissolution. The temperature was raised to 80° C., 30 ppm chloroplatinic acid was added, and this temperature was maintained for 4 hours in order to synthesize bromine-containing dimethylpolysiloxane with the following formula:

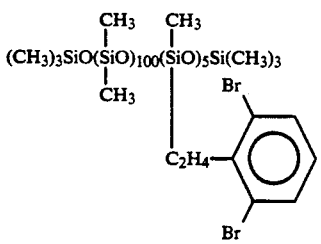

(bromine content=8.9%). Toluene was added to this bromine-containing dimethylpolysiloxane in order to prepare a toluene dispersion containing 4% of this dimethylpolysiloxane. Unoiled mechanical sewing thread (100% polyester spun yarn) in skein form was immersed in this dispersion, adjusted to a 100% expression ratio, and dried in order to bring about a 4% loading of the bromine-containing dimethylpolysiloxane. The oxygen index was measured for this treatment bath as in Example 1. The mechanical sewing thread was subsequently taken apart, and the staple fibers were removed from the spun yarn for measurement of the dynamic and static friction coefficients. In addition, the treated mechanical sewing thread was taken up to a bobbin, and its sewing performance was examined using a motorized industrial-use sewing machine. The results of this examination are reported in Table II below.

For the purposes of comparison, a fiber treatment agent was also prepared using only the above-described SiH-containing dimethylpolysiloxane. Mechanical sewing thread was treated as above and tested for comparison as above, and these results are reported in Table II below (Comparison Example 6).

TABLE II

| EXAMPLE | OXYGEN INDEX | SCF | DCF | SEWING TEST ON MOTORIZED SEWING MACHINE | GLOBAL EVALUATION |
|---|---|---|---|---|---|
| 5 | 23.0 | 0.124 | 0.105 | NO SNAPPING EXCELLENT TRANSPORT | VERY GOOD |

TABLE II-continued

| | OXYGEN INDEX | SCF | DCF | SEWING TEST ON MOTORIZED SEWING MACHINE | GLOBAL EVALUATION |
|---|---|---|---|---|---|
| COMP. EXAMPLE 6 | 18.5 | 0.123 | 0.105 | NO SNAPPING EXCELLENT TRANSPORT OF UPPER AND LOWER THREADS | UNSUITABLE |

The results reported above confirm that mechanical sewing thread treated with the treatment agent according to the present invention was nonflammable, had an excellent smoothness, and gave good results in the sewing test using a motorized sewing machine. The treatment agent is therefore highly qualified as a nonflammable smoothing agent for polyester mechanical sewing thread.

EXAMPLE 6

100 Parts amino-containing dimethylpolysiloxane (viscosity=290 cst) with the following formula

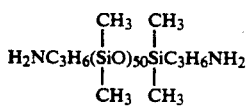

was introduced with 50 parts toluene into a 500 cc four-neck flask and dissolved to homogeneity.

Next 19.9 Parts brominated organic compound with the following formula was added

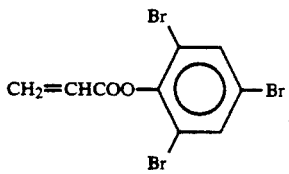

and a reaction was run as in Example 1 to synthesize a bromine-containing dimethylpolysiloxane with the following formula (dimethylpolysiloxane concentration=70.5%).

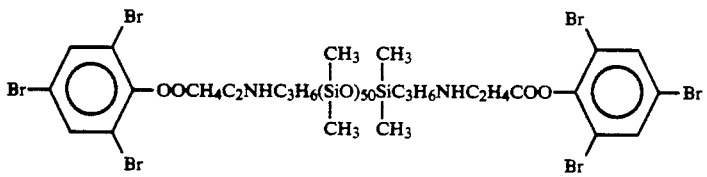

(bromine content=10.3%).

To 100 parts of this toluene dispersion containing 70.5% dimethylpolysiloxane were then added 8.0 parts trimethylnonyl polyethylene oxide (6 mol) adduct (Tergitol TMN-6 from Union Carbide) and 2.2 parts nonylphenol polyoxyethylene oxide (9.5 mol) adduct (from Sanyo Kasei Kabushiki Kaisha) with stirring to homogeneity. 15 Parts water was subsequently added with mixing with a stirrer for 10 minutes, passage through a colloid mill emulsifier, and finally the addition of another 55 parts water with dissolution/dispersion to homogeneity to afford an emulsion (bromine-containing dimethylpolysiloxane concentration=35%). 140 Parts water was added to 20 parts of this emulsion to give a PFTA containing 4% bromine-containing polydimethylsiloxane.

Unoiled mechanical sewing thread was immersed in this treatment agent, adjusted to an expression ratio of 100%, and then dried. The properties of this treated mechanical sewing thread were measured as in Example 2, and these results are reported in Table III.

For the purposes of comparison, a fiber treatment agent was prepared as above, but in the present case using the amino-containing dimethylpolysiloxane (viscosity=290 cst) precursor to the bromine-containing dimethylpolysiloxane in place of the bromine-containing dimethylpolysiloxane itself. The properties of this fiber treatment agent on polyester fiber were measured as above, and these results are reported in Table III below as Comparison Example 7. The properties of untreated polyester fiber (polyester fiber which is not treated with a fiber finishing agent) were measured as in Comparison Example 4 and these results are reported in Table III below (Comparison Example 8).

TABLE III

| | OXYGEN INDEX | SCF | DCF | SEWING TEST ON MOTORIZED SEWING MACHINE | GLOBAL EVALUATION |
|---|---|---|---|---|---|
| EXAMPLE 6 | 22.9 | 0.122 | 0.104 | NO SNAPPING EXCELLENT TRANSPORT OF UPPER AND LOWER THREADS | VERY GOOD |
| COMP. EXAMPLE 7 | 18.3 | 0.123 | 0.103 | NO SNAPPING | UNSUITABLE |

TABLE III-continued

| | OXYGEN INDEX | SCF | DCF | SEWING TEST ON MOTORIZED SEWING MACHINE | GLOBAL EVALUATION |
|---|---|---|---|---|---|
| | | | | EXCELLENT TRANSPORT OF UPPER AND LOWER THREADS | |
| 8 | 19.3 | 0.317 | 0.218 | VERY POOR TRANSPORT OF UPPER AND LOWER THREADS RESULTING IN SNAPPING | UNSUITABLE |

In Tables II and III shown hereinabove, SCF denotes Static Coefficient of Friction, DCF denotes Dynamic Coefficient of Friction, and global evaluation refers to the evaluation of the example as a nonflammable polyester mechanical sewing thread.

It is clear from the reported results that the polyester mechanical sewing thread afforded by the treatment agent according to the present invention was nonflammable, had an excellent smoothness, and performed well in the sewing test on a motor-driven sewing machine.

We claim:

1. A composition comprising an organosilicon compound selected from the group consisting of:
   (i) an addition-reaction product of an amino-containing organosilicon compound and a vinyl-containing brominated organic compound;
   (ii) an addition-reaction product of an SiH-containing organosilicon compound and a vinyl-containing brominated organic compound; and
   (iii) an addition-reaction product of an amino-containing organosilicon compound and an epoxy-containing brominated organic compound.

2. A composition according to claim 1, wherein the amino containing organosilicon compound is an amino-containing alkoxysilane.

3. A composition according to claim 1, wherein the amino-containing organosilicon compound is a compound having its formula selected from the group consisting of

and

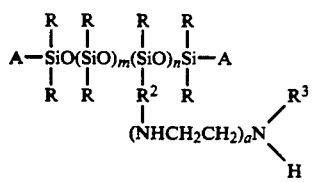

wherein R represents monovalent hydrocarbon groups, $R^1$ represent monovalent hydrocarbon groups, c has a value of 0 or 1, $R^2$ represents divalent hydrocarbon groups, $R^3$ is a group selected from the group consisting of hydrogen and monovalent hydrocarbon groups, A is a group selected from the group consisting of R groups, a hydroxyl group, and alkoxy groups, m is an integer having a value of at least 1, n is an integer having a value of at least 1, and a is an integer having a value of 0 to 5.

4. A composition according to claim 1, wherein the vinyl-containing brominated organic compound is selected from the group consisting of

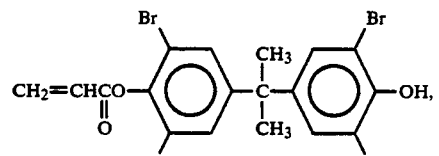

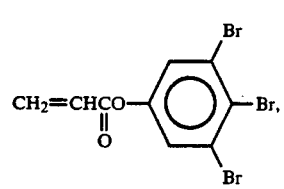

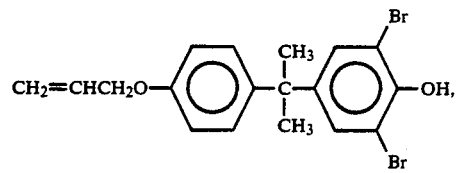

and

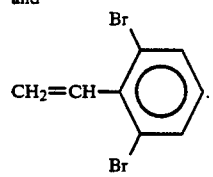

5. A composition according to claim 1, wherein the Si-H containing organosilicon compound is a compound having its formula selected from the group consisting of

and

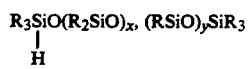

wherein R represents one or more monovalent hydrocarbon groups, x is 0 or an integer with a value of at least 1, a is 0 or 1, x' is an integer having a value of at least 1, and y is an integer having a value of at least 1.

6. A composition according to claim 5, wherein x has a value from 5 to 150, x' has a value from 5 to 1000, and y has a value from 2 to 200.

7. A composition according to claim 5, wherein x has a value from 5 to 150, x' has a value from 100 to 500, and y has a value from 5 to 50.

8. A composition according to claim 1, wherein the epoxy-containing brominated organic compound is selected from the group consisting of

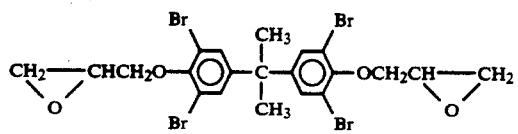

and

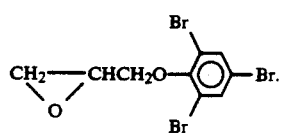

9. A composition according to claim 1, wherein the compound additionally comprises an emulsifier.

10. A composition according to claim 9, wherein the emulsifier is selected from the group consisting of nonionic surfactants, cationic surfactants, and anionic surfactants.

11. A composition according to claim 10, wherein the nonionic surfactants are selected from the group consisting of polyoxyalkylene alkyl ethers, polyoxyalkylene alkylphenol ethers, polyoxyalkylene alkyl esters, polyoxyalkylene sorbitan alkyl esters, polyethylene glycols, polypropylene glycols, and diethylene glycol.

12. A composition according to claim 10, wherein the anionic surfactants are selected from the group consisting of alkylbenzenesulfonic acids, sulfuric acid esters of polyoxyethylene monoalkyl ethers, and sodium, potassium, and amine salts of alkylnaphthylsulfonic acids.

13. A composition according to claim 10, wherein the cationic surfactants are selected from the group consisting quaternary ammonium hydroxides, and salts thereof.

14. An emulsion of the composition according to claim 9.

15. A method of treating fiber, which comprises:
(a) forming an emulsion of a composition comprising an organosilicon compound selected from the group consisting of:
  (i) an addition-reaction product of an amino-containing organosilicon compound and a vinyl-containing brominated organic compound;
  (ii) an addition-reaction product of an SiH-containing organosilicon compound and a vinyl-containing brominated organic compound; and
  (iii) an addition-reaction product of an amino-containing organosilicon compound and an epoxy-containing brominated organic compound;
(b) applying the emulsion of step (a) to the fiber;
(c) drying the fiber;
(d) heating the fiber until the emulsion is firmly adhered to the surface of the fiber.

16. A method of treating fiber, which comprises:
(a) forming a solution of a composition comprising an organosilicon compound selected from the group consisting of:
  (i) an addition-reaction product of an amino-containing organosilicon compound and a vinyl-containing brominated organic compound;
  (ii) an addition-reaction product of an SiH-containing organosilicon compound and a vinyl-containing brominated organic compound; and
  (iii) an addition-reaction product of an amino-containing organosilicon compound and an epoxy-containing brominated organic compound by dissolving the organosilicon compound in a solvent;
(b) applying the solution of step (a) to the fiber;
(c) drying the fiber;
(d) heating the fiber until the solution is firmly adhered to the surface of the fiber.

17. Polyester fiber coated with the composition of claim 1.

* * * * *